(12) United States Patent
Kung et al.

(10) Patent No.: US 7,608,791 B2
(45) Date of Patent: Oct. 27, 2009

(54) FASTENER MODULE CONTROLLED BY MAGNETIC FORCE

(75) Inventors: Shao-Tsu Kung, Taipei (TW); Yi-Hung Shen, Taipei (TW)

(73) Assignee: Compal Electronics, Inc., Taipei (TW)

( * ) Notice: Subject to any disclaimer, the term of this patent is extended or adjusted under 35 U.S.C. 154(b) by 287 days.

(21) Appl. No.: 11/829,949

(22) Filed: Jul. 29, 2007

(65) Prior Publication Data
US 2008/0073344 A1 Mar. 27, 2008

(30) Foreign Application Priority Data
Sep. 27, 2006 (TW) .............................. 95135734 A

(51) Int. Cl.
*H01H 9/00* (2006.01)
(52) U.S. Cl. ............ 200/61.62; 292/251.5; 361/679.55
(58) Field of Classification Search ............. 200/61.62, 200/61.64, 61.7, 61.71, 61.73; 292/251.5, 292/137, 140, 150, 163, 302; 361/679.02, 361/679.04, 679.07–679.17, 679.21, 679.26, 361/679.27, 679.29, 679.3, 679.55–679.58
See application file for complete search history.

(56) References Cited
U.S. PATENT DOCUMENTS

| | | | | |
|---|---|---|---|---|
| 5,077,551 A | * | 12/1991 | Saitou | ........................ 345/207 |
| 5,722,706 A | * | 3/1998 | Bartel et al. | ................. 292/216 |
| 5,932,855 A | * | 8/1999 | Wang et al. | .............. 200/50.04 |
| 6,891,722 B2 | * | 5/2005 | Chen et al. | ............. 361/679.55 |
| 6,930,263 B2 | * | 8/2005 | Hung | ....................... 200/61.62 |
| 7,082,035 B2 | * | 7/2006 | Kim | ........................... 361/726 |
| 7,216,900 B2 | * | 5/2007 | Liu et al. | ....................... 292/98 |
| 7,261,331 B2 | * | 8/2007 | Lin | ............................ 292/116 |
| 7,390,983 B2 | * | 6/2008 | Mizuno et al. | ............. 200/61.7 |
| 7,405,927 B2 | * | 7/2008 | Lev | ........................ 361/679.55 |
| 7,407,202 B2 | * | 8/2008 | Ye et al. | ................... 292/251.5 |
| 7,438,333 B2 | * | 10/2008 | Wu et al. | .................. 292/251.5 |
| 7,492,583 B2 | * | 2/2009 | Lv | ......................... 361/679.26 |
| 7,495,901 B2 | * | 2/2009 | Yun et al. | ............... 361/679.55 |
| 7,518,072 B2 | * | 4/2009 | Yoda | ........................ 200/61.62 |

* cited by examiner

*Primary Examiner*—Michael A Friedhofer
(74) *Attorney, Agent, or Firm*—Jianq Chyun IP Office

(57) ABSTRACT

A fastener module suitable for a foldable electronic apparatus with a first body and a second body pivotally jointed with each other is provided. The module includes a first fastener, a second fastener, a control circuit, and a magnetic element. The first fastener is disposed in the first body and has magnetic susceptibility. The second fastener is disposed in the second body and suitable for being fastened with the first fastener. The control circuit is disposed in the foldable electronic apparatus. The magnetic element is disposed in the foldable electronic apparatus, and is coupled to the control circuit. The magnetic element is controlled by the control circuit to determine whether to exert a magnetic force on the first fastener for driving the first fastener to be fastened with the second fastener.

7 Claims, 2 Drawing Sheets

FASTENER MODULE CONTROLLED BY MAGNETIC FORCE

CROSS-REFERENCE TO RELATED APPLICATION

This application claims the priority benefit of Taiwan application serial no. 95135734, filed Sep. 27, 2006. All disclosure of the Taiwan application is incorporated herein by reference.

BACKGROUND OF THE INVENTION

1. Field of the Invention

The present invention relates to a fastener module, and more particularly to a fastener module controlled by magnetic force applicable to a foldable electronic apparatus.

2. Description of Related Art

Due to the development of semiconductor elements and display technology, an electronic apparatus is gradually developed towards a trend of being small sized, multi-functional, and convenience in carry. A foldable electronic apparatus is applied widely due to its effectively reduced area. Common foldable electronic apparatuses include a personal digital assistant, a mobile phone, a notebook computer, etc.

For example, a common notebook computer mainly includes two parts, i.e., a display and a host, which are pivotally jointed with each other. With respect to the host, the display may be lifted upward to be in an opened state or covered downward to be in a closed state. When the notebook is not in use, the display may be covered on the host, such that the display, a keyboard, and other easily damaged elements may be covered in the case and well protected. Under some unstable circumstances, for example, the notebook computer is carried by a user or is impacted, the notebook computer further needs a fastener to maintain the closed state, so as to prevent the notebook computer from being opened improperly.

A conventional purely mechanical fastener mostly includes a hook, a hole, and a restoring element. The two parts of the notebook computer may be fixed together once the hook enters the hole, so as to be maintained in a closed state, and the restoring element is used to ensure the fastening between the hook and the hole. However, since the hook protrudes from the surface of the body of the notebook computer, it negatively affects the whole appearance of the body and will be easily damaged. Therefore, a fastener with a hook hidden under the surface of the body is developed.

Taiwan Patent No. M270634 discloses a fastener module for a notebook computer, which includes a hook, a hole, and a permanent magnet. The hook is disposed in the host of the notebook computer and has magnetic susceptibility, and the hole and the permanent magnet are both in the display of the notebook computer. When the notebook computer is in an opened state, the hook is horizontally hidden in the host. When the notebook computer is in a closed state, the hook with the magnetic susceptibility is drawn by the permanent magnet to be erected from the horizontal position, so as to be fastened with the hole. Since the hook may be received in the host, it will not disturb the user using the notebook computer.

With regard to the fastener, the hook may be received in the host by using the permanent magnet when the notebook computer is not in use. However, the magnetic force provided by the permanent magnet is a continuous magnetic force, so that the user must exert a force larger than the magnetic force of the permanent magnet to open the notebook computer, thereby causing inconvenience in the usage.

SUMMARY OF THE INVENTION

The present invention is directed to provide a fastener module suitable for a foldable electronic apparatus, such that a user may open the foldable electronic apparatus at ease.

As embodied and broadly described herein, the present invention provides a fastener module suitable for a foldable electronic apparatus with a first body and a second body pivotally jointed with the first body. The fastener module includes a first fastener, a second fastener, a control circuit, a sensor, and a magnetic element. The first fastener is disposed in the first body and has magnetic susceptibility. The second fastener is disposed in the second body and suitable for being fastened with the first fastener. The control circuit is disposed within the foldable electronic apparatus. The sensor is disposed in the first body or the second body, and coupled to the control circuit for providing a trigger signal to inform the control circuit that the first body and the second body are in a closed state. The magnetic element is disposed in the foldable electronic apparatus and coupled to the control circuit, and is controlled by a control circuit to determine whether to exert a magnetic force on the first fastener for driving the first fastener to be fastened with the second fastener.

In an embodiment of the present invention, the first fastener includes a hook, and the second fastener includes a hole.

In an embodiment of the present invention, after the magnetic element has exerted a magnetic force on the first fastener for a predetermined time, the control circuit controls the magnetic element to stop exerting the magnetic force on the first fastener.

In an embodiment of the present invention, the control circuit includes a switching element and a controller. The switching element is coupled to the magnetic element. The controller is coupled to the switching element and the sensor for controlling the switching element whether to supply power for the magnetic element.

In an embodiment of the present invention, the control circuit further includes a power supplier coupled to the switching element and the controller, and the controller controls the switching element whether to supply power to the magnetic element from the power supplier.

In an embodiment of the present invention, the fastener module further includes a release mechanism disposed in the first body to release the fastening between the first fastener and the second fastener.

In an embodiment of the present invention, the magnetic element is an electromagnet.

In the present invention, the magnetic element does not continuously exert the magnetic force on the first fastener, but stop exerting the magnetic force on the first fastener when the foldable electronic apparatus is closed. Therefore, when opening the foldable electronic apparatus, the user need not overcome the magnetic force of the magnetic element, thereby easily opening the foldable electronic apparatus with a small force.

In order to make the aforementioned and other objects, features and advantages of the present invention comprehensible, an embodiment accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate an embodiment of the invention and, together with the description, serve to explain the principles of the invention.

DESCRIPTION OF EMBODIMENTS

Figure 1:
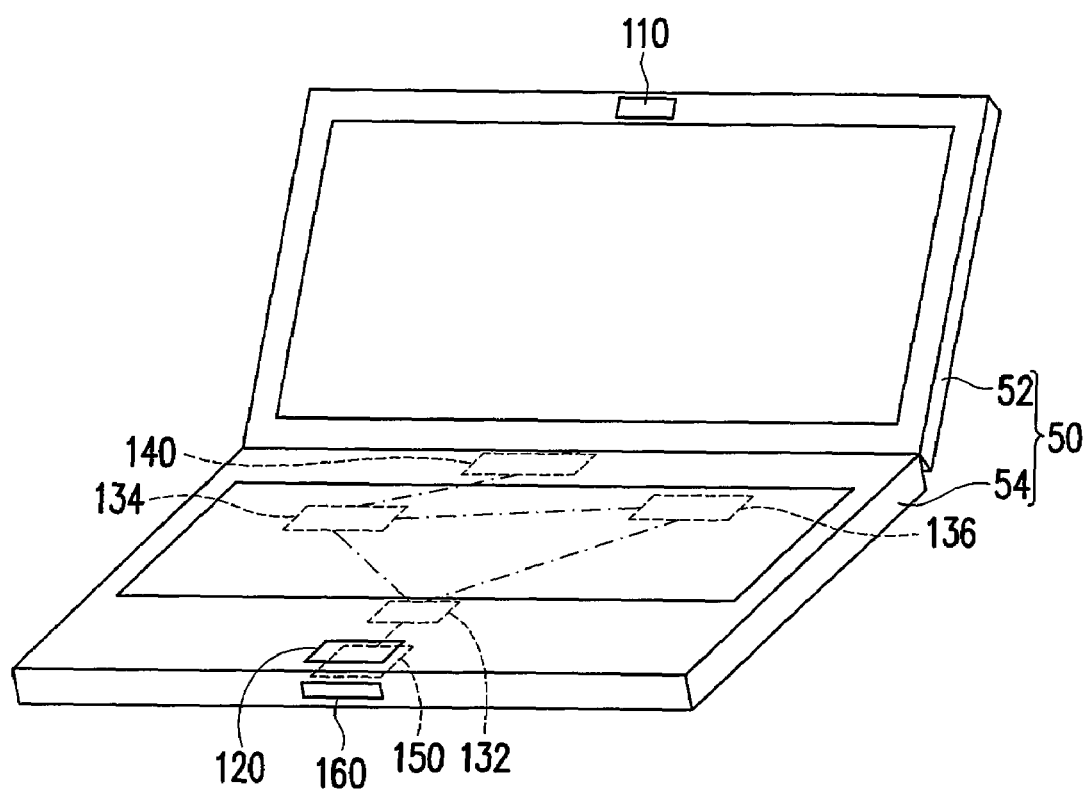
FIG. 1 illustrates a foldable electronic apparatus employing the fastener module according to an embodiment of the present invention.
Figure 2:
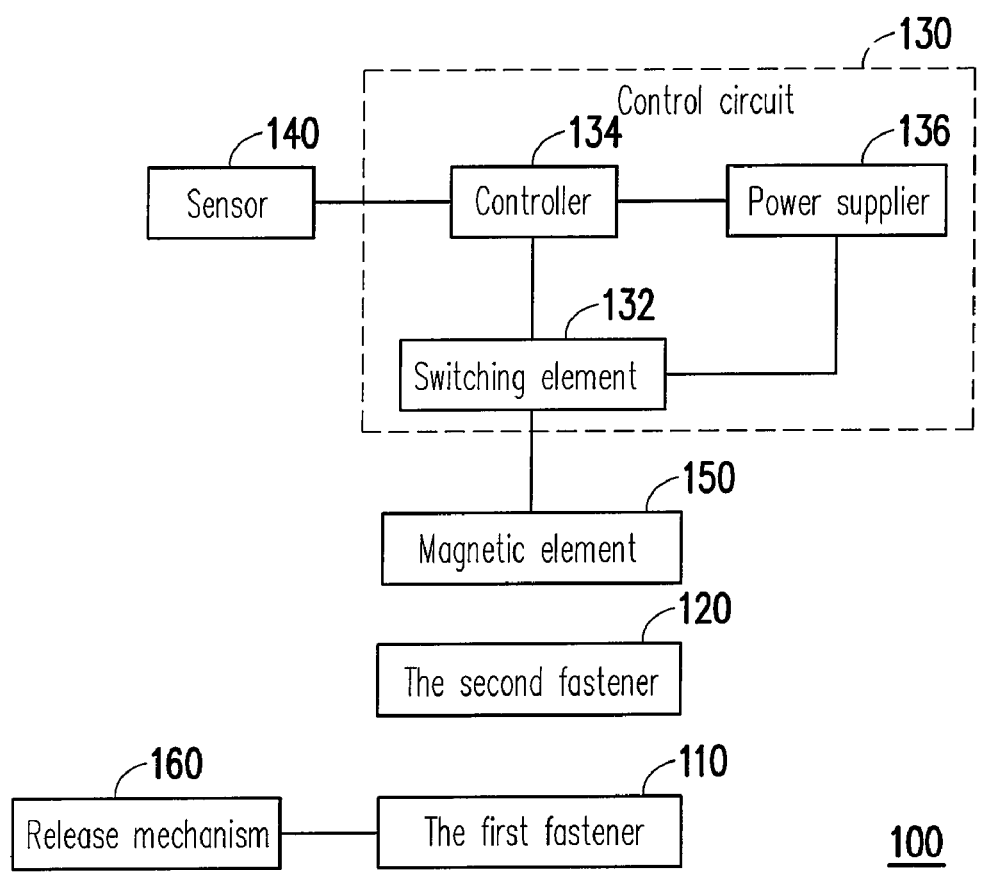
FIG. 2 illustrates the fastener module in FIG. 1.

FIG. 1 illustrates a foldable electronic apparatus employing the fastener module according to an embodiment of the present invention. FIG. 2 illustrates the fastener module in FIG. 1. Referring to FIGS. 1 and 2, for example, the foldable electronic apparatus 50 in this embodiment is a notebook computer, but may also be another foldable electronic apparatus, such as a personal digital assistant or a mobile phone, so the foldable electronic apparatus 50 is not limited in the present invention at all.

The foldable electronic apparatus 50 includes a first body 52 and a second body 54 pivotally jointed with the first body 52. When the first body 52 and the second body 54 are in a closed state, in order to fix the relative position between the first body 52 and the second body 54, the foldable electronic apparatus 50 further includes a fastener module 100.

The fastener module 100 includes a first fastener 110, a second fastener 120, a control circuit 130, a sensor 140, and a magnetic element 150. The first fastener 110 includes a hook, which is disposed in the first body 52 and has magnetic susceptibility. The second fastener 120 includes a hole, which is disposed in the second body 54 and is suitable for being fastened with the first fastener 110. The examples of the first fastener 110 and the second fastener 120 may be referred in Taiwan Patent No. M270634, but is not limited thereby in the present invention.

The control circuit 130 is disposed in the foldable electronic apparatus 50. The sensor 140 is disposed in the first body 52 or the second body 54, and coupled to the control circuit 130, so as to provide a trigger signal to inform the control circuit 130 that the first body 52 and the second body 54 are in a closed state. The magnetic element 150 is disposed in the foldable electronic apparatus 50, and coupled to the control circuit 130, and the magnetic element 150 is controlled by the control circuit 130 to determine whether to exert a magnetic force on the first fastener 110 for driving the first fastener 110 to be fastened with the second fastener 120.

In this embodiment, the control circuit 130 includes a switching element 132, a controller 134, and a power supplier 136. The switching element 132 is coupled to the magnetic element 150. The controller 134 is coupled to the switching element 132 and the sensor 140. The power supplier 136 is coupled to the switching element 132 and the controller 134, and the controller 134 controls the switching element 132 whether to supply power to the magnetic element 150 from the power supplier 136.

In this embodiment, the magnetic element 150 is an electromagnet, but not a permanent magnet. In addition, after the magnetic element 150 exerts a magnetic force on the first fastener 110 for a predetermined time, the control circuit 130 controls the magnetic element 150 to stop exerting the magnetic force on the first fastener 110. Furthermore, the fastener module 100 further includes a release mechanism 160 disposed in the first body 52, for leasing the fastening between the first fastener 110 and the second fastener 120. The example of the release mechanism 160 may be referred in Taiwan Patent No. M270634, but is not limited thereby in the present invention.

When a user closes the foldable electronic apparatus 50, the sensor 140 senses the relative closing action of the first body 52 and the second body 54 and then sends a trigger signal to the control circuit 130. Upon receiving the trigger signal, the control circuit 130 controls the magnetic element 150 to exert a magnetic force on the first fastener 110, so as to fasten the first fastener 110 with the second fastener 120 and fix the first body 52 and the second body 54 to be in a closed state. More particularly, is when receiving the trigger signal from the sensor 140, the controller 134 controls the switching element 132 to make the power supplier 136 supply power to the magnetic element 150, such that the magnetic element 150 generates magnetism and the first fastener 110 and the second fastener 120 are fastened together.

After the magnetic element 150 exerts the magnetic force on the first fastener 110 to make the first fastener 110 be fastened with the second fastener 120, the control circuit 130 controls the magnetic element 150 to stop exerting the magnetic force on the first fastener 110, such that the user need not overcome the magnetic force when opening the foldable electronic apparatus 50, thereby saving electric power. To open the foldable electronic apparatus 50, the user only needs to release the fastening between the first fastener 110 and the second fastener 120 by using the release mechanism 160 because no magnetic force is exerted on the first fastener 110 at this time and the user may easily open the foldable electronic apparatus 50 without overcoming the magnetic force.

In view of the above, in the present invention, the magnetic element uses the electromagnet, and the magnetic element does not continuously exert the magnetic force on the first fastener, but stop exerting the magnetic force on the first fastener when the foldable electronic apparatus is closed. Therefore, when opening the foldable electronic apparatus, the user need not overcome the magnetic force of the magnetic element, thereby easily opening the foldable electronic apparatus with a small force.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A fastener module, suitable for being applied to a foldable electronic apparatus with a first body and a second body pivotally jointed with the first body, the fastener module comprising:

a first fastener, disposed in the first body and having magnetic susceptibility;

a second fastener, disposed in the second body and suitable for being fastened with the first fastener;

a control circuit, disposed in the foldable electronic apparatus;

a sensor, disposed in the first body or the second body, and coupled to the control circuit, for providing a trigger signal to inform the control circuit that the first body and the second body are in a closed state; and a magnetic element, disposed in the foldable electronic apparatus and coupled to the control circuit, wherein the magnetic element is controlled by the control circuit to determine whether to exert a magnetic force on the first fastener for driving the first fastener to be fastened with the second fastener.

2. The fastener module as claimed in claim 1, wherein the first fastener comprises a hook, and the second fastener comprises a hole.

3. The fastener module as claimed in claim 1, wherein after the magnetic element exerts a magnetic force on the first fastener for a predetermined time, the control circuit controls the magnetic element to stop exerting the magnetic force on the first fastener.

4. The fastener module as claimed in claim 1, wherein the control circuit comprises:

a switching element, coupled to the magnetic element; and a controller, coupled to the switching element and the sensor, for controlling the switching element whether to supply power to the magnetic element.

5. The fastener module as claimed in claim 4, wherein the control circuit further comprises:

a power supplier, coupled to the switching element and the controller, wherein the controller controls the switching element whether to supply power to the magnetic element from the power supplier.

6. The fastener module as claimed in claim 1, further comprising:

a release mechanism, disposed in the first body, for releasing the fastening between the first fastener and the second fastener.

7. The fastener module as claimed in claim 1, wherein the magnetic element is an electromagnet.

* * * * *